US010044776B2

(12) United States Patent
Ye

(10) Patent No.: US 10,044,776 B2
(45) Date of Patent: Aug. 7, 2018

(54) COMBINING COMMUNICATION CONTENTS

(71) Applicant: Alibaba Group Holding Limited, Grand Cayman (KY)

(72) Inventor: Jun Ye, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 72 days.

(21) Appl. No.: 14/489,330

(22) Filed: Sep. 17, 2014

(65) Prior Publication Data

US 2015/0081818 A1     Mar. 19, 2015

(30) Foreign Application Priority Data

Sep. 18, 2013   (CN) .......................... 2013 1 0430474

(51) Int. Cl.
*G06Q 30/06*     (2012.01)
*H04L 29/06*     (2006.01)
(Continued)

(52) U.S. Cl.
CPC ....... *H04L 65/403* (2013.01); *G06Q 30/0619* (2013.01); *H04L 51/04* (2013.01);
(Continued)

(58) Field of Classification Search
None
See application file for complete search history.

(56) References Cited

U.S. PATENT DOCUMENTS 7,383,310 B1 *   6/2008   Lyle .................... G06Q 10/107
709/204
2002/0095454 A1    7/2002   Reed et al.
(Continued)

OTHER PUBLICATIONS

Anonymous, "Method to manage instant messaging chat history from a thread logical view", IP.com Journal, IP.com Inc., West Henrietta, NY, Jan. 17, 2012, pp. 1-6.
(Continued)

*Primary Examiner* — Philip Chea
*Assistant Examiner* — Hassan Khan
(74) *Attorney, Agent, or Firm* — Lee & Hayes, PLLC

(57) ABSTRACT

When a communication message notification initiated by a current communication window is received, a correlation relationship between a party participating in a communication and K communication subjects that belong to a same user system which acts as another party participating in the communication is obtained respectively. The K communication subjects that belong to the same user system have a common principal account and each communication subject has a corresponding child account. Alternatively, the K communication subjects use a same account and logs in different communication tools in the same system. K≥1. According to the correlation relationship, historical communication contents between the party participating in the communication and the K communication subjects are obtained respectively. The historical communication contents are combined. The combined communication contents are saved and displayed. The present techniques avoid the tedious and overdue problem of manually combining the communication contents.

14 Claims, 9 Drawing Sheets

(51) Int. Cl.
*H04L 12/58* (2006.01)
*H04W 4/21* (2018.01)
*H04W 4/20* (2018.01)

(52) U.S. Cl.
CPC ............ *H04L 51/16* (2013.01); *H04W 4/206* (2013.01); *H04W 4/21* (2018.02)

(56) References Cited

U.S. PATENT DOCUMENTS

| | | | | |
|---|---|---|---|---|
| 2003/0114174 | A1* | 6/2003 | Walsh | H04L 51/38 455/466 |
| 2004/0137884 | A1* | 7/2004 | Engstrom | H04L 51/16 455/414.1 |
| 2005/0080852 | A1* | 4/2005 | Kelley | G06Q 10/107 709/206 |
| 2006/0155715 | A1* | 7/2006 | Duffek | G06Q 10/107 |
| 2006/0235933 | A1* | 10/2006 | Baluja | G06Q 10/107 709/207 |
| 2007/0106795 | A1 | 5/2007 | Gilfix et al. | |
| 2009/0292814 | A1* | 11/2009 | Ting | G06F 15/16 709/229 |
| 2009/0327422 | A1* | 12/2009 | Katis | H04L 12/1827 709/204 |
| 2010/0306154 | A1 | 12/2010 | Poray et al. | |
| 2010/0312839 | A1* | 12/2010 | Zhang | H04L 51/043 709/206 |
| 2011/0141919 | A1* | 6/2011 | Singh | H04L 41/0681 370/252 |
| 2011/0207484 | A1* | 8/2011 | Karnam Holal | H04L 51/16 455/466 |
| 2012/0231770 | A1* | 9/2012 | Clarke | H04L 51/34 455/414.1 |
| 2013/0136253 | A1 | 5/2013 | Liberman Ben-Ami et al. | |
| 2013/0157626 | A1 | 6/2013 | Talwar et al. | |
| 2013/0204888 | A1* | 8/2013 | Guzman Suarez | H04L 51/36 707/758 |
| 2013/0318450 | A1 | 11/2013 | Wyatt | |
| 2014/0122619 | A1* | 5/2014 | Duan | G06F 17/27 709/206 |

OTHER PUBLICATIONS

Fono, et al., "Structuring and Supporting Persistent Chat Conversations", Proceedings of the 2006 20th Anniversary Conference on Computer Supported Cooperative Work, CSCW '06, Jan. 1, 2006, New York, New York, pp. 455-458.

PCT Search Report and Written Opinion dated Dec. 2, 2014 for PCT Application No. PCT/US14/56139, 12 Pages.

* cited by examiner

COMBINING COMMUNICATION CONTENTS

CROSS REFERENCE TO RELATED PATENT APPLICATIONS

This application claims foreign priority to Chinese Patent Application No. 201310430474.5 filed on 18 Sep. 2013, entitled "Method and System for Combining Communication Contents," which is hereby incorporated by reference in its entirety.

TECHNICAL FIELD

The present disclosure is related to the Internet technology, and more particularly, to a method and system for combing communication contents.

BACKGROUND

With the development of the Internet technology, there are various chatting communication methods, such as a communication using a short messaging function within a web system and a communication through a professional chatting communication tool. The general chatting communication tool includes an instant messenger (IM) based on a software at a client terminal and an IM based on web. A user may choose different chatting communication methods or chatting communication tools for communication. However, when the user wants to review all communication contents at different chatting communication tools, the user needs to open these different chatting communication tools, obtain communication contents from different chatting communication tools, and finally manually combine these obtained communication contents. Such operations are tedious and cause delay in timely combining the communication contents.

Furthermore, with the development of the chatting communication tools, the chatting communication tools are more and more widely used. For example, the chatting communication tools may be used in e-commerce to implement a communication between buyers and sellers.

By using example of any chatting communication tool in the application of e-commerce, a buyer A visits a shop of a seller B to purchase a product. The shop of the seller B has three child accounts for customer representative, i.e., B1, B2, and B3, which provide an online communication service. The buyer A selects a customer representative B1 to conduct communication to learn price and inventory information of a particular product. After the communication with B1 is completed, after a certain period of time, the buyer A has some other questions of the particular product and wants to further inquire the customer service of the seller B. The buyer A finds that the customer representative B1 is offline and reaches a customer representative B2 to inquire. There arises a problem that the customer representative B2 does not know the communication contents between the buyer A and the customer representative account B1 and thus B2 cannot accurately understand the current question of the buyer A.

To solve the problem, the customer representative B2 has to go over the questions that the buyer A had communicated with the customer representative B1. Alternatively, the customer representative B2 may open a computer of the customer representative B1 to review a chatting log between the customer representative B1 and the buyer and then respond to the current question of the buyer A. Either of the two solutions requires manually combining the communication contents between the buyer and multiple customer representatives. The operations are tedious and consume a lot of time. The communication contents may not be timely combined. In the meantime, a process of combing consumes a lot of labor and time, thereby causing waste of resources and increasing a communication cost.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present disclosure provides a method and system for combining communication contents to solve the tedious and overdue problem of manually combining the communication contents.

The present disclosure provides an example method for combining communication contents. When a communication message notification initiated by a current communication window is received, a correlation relationship between a party participating in a communication and K communication subjects that belong to a same user system as another party participating in the communication is obtained respectively. The K communication subjects that belong to the same user system may have a common principal account and each communication subject has a corresponding child account. Alternatively, the K communication subjects may use a same account to log into different communication tools in the same system. $K \geq 1$.

According to the correlation relationship, historical communication contents between the party participating in the communication and the K communication subjects are obtained respectively.

The historical communication contents between the party participating in the communication and the K communication subjects are combined and the combined communication contents are saved. The combined communication contents are pushed and displayed at the current communication window.

For example, the K communication subjects may include a current communication subject that establishes the communication with the party participating in the communication in the current communication window and some other communication subjects, except for the current communication subject, belong to the same user system that previously established some other communications with the party participating in the communication.

For example, the correlation relationship between the party participating in the communication and the K communication subjects that belong to the same user system as another party participating in the communication may be obtained respectively according to the following operations. The correlation relationship between the party participating in the communication and K communication subjects that belong to the same user system as another party participating in the communication may be searched from saved correlation relationships. If the correlation relationship is found, the correlation relationship between the party participating in the communication and the K communication subjects of another party participating in the communication may be obtained.

For another example, if the correlation relationship between the party participating in the communication and the current communication subject is not found from the saved correlation relationships, the correlation relationship between the party participating in the communication and the current communication subject is saved.

For example, the historical communication contents between the party participating in the communication and the K communication subjects may be combined according to the following operations. The historical communication contents between the party participating in the communication and the K communication subjects may be combined according to a chronological sequence of the historical communication contents. Alternatively, the historical communication contents between the party participating in the communication and the K communication subjects may be combined according to the chronological sequence of the historical communication contents and similarity degrees between the historical communication contents.

For example, the historical communication contents between the party participating in the communication and the K communication subjects may be combined according to the chronological sequence of the historical communication contents based on the following operations.

The historical communication contents between the party participating in the communication and the K communication subjects are segmented according to the chronological sequence of time information recorded in a session log that the party participating in the communication leaves when the party participating in the communication visits a webpage. Historical communication contents between the party participating in the communication and one or more other communication subjects in each time segment is obtained. The historical communication contents in each time segment are combined into one segment. Each segment of communication contents is ranked according to the chronological sequence of the communication and the ranked segments of the communication contents are used as the combined communication contents.

For example, the combined communication contents may be saved by the following operations. A key-value database is established to store the combined communication contents. A key represents a corresponding relationship between the party participating in the communication and the user system. A value represents the combined communication contents.

For example, the combined communication contents may be displayed by the following operations. The combined communication contents are displayed by different colors at the current communication window. Alternatively, a new area is extended from the current communication window to display the combined communication contents.

For example, the combined communication contents may be displayed by the following operations. By default, each segment of communication contents is displayed. Alternatively, one or more segments of communication contents relevant to the communication content of the current communication window are displayed. In addition, a prompt message of a previous segment of communication contents and a following segment of communication contents may be displayed.

Correspondingly, the present disclosure also provides an example system for combining communication contents. The system may include a correlation relationship obtaining module, a communication content obtaining module, a communication content combining module, a communication content saving module, and a communication content pushing and displaying module.

The correlation relationship obtaining module, when a communication message notification initiated by a current communication window is received, obtains a correlation relationship between a party participating in a communication and K communication subjects that belong to a same user system as another party participating in the communication respectively. The K communication subjects that belong to the same user system may have a common principal account and each communication subject may have a corresponding child account. Alternatively, the K communication subjects may use a same account to log into different communication tools in the same system. K≥1.

The communication content obtaining module, according to the correlation relationship, obtains historical communication contents between the party participating in the communication and the K communication subjects respectively.

The communication content combining module combines the historical communication contents between the party participating in the communication and the K communication subjects.

The communication content saving module saves the combined communication contents.

The communication content pushing and displaying module pushes and displays the combined communication contents at the current communication window.

For example, the K communication subjects may include a current communication subject that establishes the communication with the party participating in the communication in the current communication window and some other communication subjects, except for the current communication subject, belong to the same user system that previously established some other communications with the party participating in the communication.

For example, the correlation relationship obtaining module may include a searching sub-module and an obtaining sub-module. The searching sub-module searches the correlation relationship between the party participating in the communication and the K communication subjects that belong to the same user system as another party participating in the communication from the saved correlation relationships. The obtaining sub-module, when the correlation relationship is found, obtains the correlation relationship between the party participating in the communication and the K communication subjects of another party participating in the communication.

For example, the correlation relationship obtaining module may also include a saving sub-module. When the correlation relationship between the party participating in the communication and the current communication subject is not found from the saved correlation relationships, the saving sub-module saves the correlation relationship between the party participating in the communication and the current communication subject.

For example, the communication content combining module may include a first commination content combining sub-module and/or a second communication module. The first communication content combining sub-module combines the historical communication contents between the party participating in the communication and the K communication subjects according to a chronological sequence of the historical communication contents. Alternatively, the second communication content combining module combines the historical communication contents between the party participating in the communication and the K communication subjects according to the chronological sequence of the historical communication contents and similarity degrees between the historical communication contents.

For example, the first communication content combining sub-module may include a communication content segmenting sub-unit, a communication content obtaining sub-unit, a communication content pre-combining sub-unit, and a communication content combining sub-unit.

The communication content segmenting sub-unit segments the historical communication contents between the party participating in the communication and the K communication subjects according to the chronological sequence of time information recorded in a session log that the party participating in the communication leaves when the party participating in the communication visits a webpage.

The communication content obtaining sub-unit obtains historical communication contents between the party participating in the communication and one or more other communication subjects in each time segment.

The communication content pre-combining sub-unit combines the historical communication contents in each time segment into one segment.

The communication content combining unit ranks each segment of communication contents according to the chronological sequence of the communication and uses the ranked segments of the communication contents as the combined communication contents.

For example, the communication content saving module may be used to establish a key-value database to store the combined communication contents. A key represents a corresponding relationship between the party participating in the communication and the user system. A value represents the combined communication contents.

For example, the communication content pushing and displaying module may include a first pushing and displaying sub-module and/or a second pushing and displaying sub-module. The first pushing and displaying sub-module displays the combined communication contents by different colors at the current communication window. Alternatively, the second pushing and displaying sub-module extends a new area from the current communication window to display the combined communication contents.

Alternatively, the communication content pushing and displaying module may include a third pushing and displaying sub-module and/or a fourth pushing and displaying sub-module. The third pushing and displaying sub-module displays each segment of communication contents by default. The fourth pushing and displaying sub-module displays one or more segments of communication contents relevant to the communication content of the current communication window. In addition, the fourth pushing and displaying module displays a prompt message of a previous segment of communication contents and a following segment of communication contents.

The methods and systems of combining communication contents of the present disclosure may automatically combine the communication contents between one party participating in the communication and the K communication subjects belonging to the same user system which acts as another party participating in the communication, quickly organize the communication contents, combine the communication contents in multiple windows efficiently and in real-time, avoid a manual combing process, and resolve the tedious and inefficient problem of manually combining the communication contents.

In addition, the present techniques associate the session log that the user leaves when visiting the webpage with the communication contents, automatically determine a boundary of the communication contents, and automatically and accurately combine the communication contents based on a context.

Furthermore, the present techniques use pushing operations to inform the parties to timely read the combined communication contents and implement timely notification of relevant communication contents based on the context.

Finally, when displaying the combined communication contents, the present techniques may directly display the combine communication contents at the current window to read the combined communication contents without switching between windows, thereby ensuring a consistency of user experiences.

DETAILED DESCRIPTION

The following description describes the present disclosure with reference to the accompanied FIGS. to clearly illustrate the purpose, technical solutions, and advantages of the present disclosure.

The present disclosure provides an example method for combining communication contents. According to an obtained correlation relationship between a party participating in a communication and K communication subjects that belong to a same user system that acts as another party participating in the communication, communication contents corresponding to the correlation relationship are obtained from a message record database. The present techniques also automatically determine a boundary of the communication contents and merge the communication contents, thereby implementing an automatic merger of the communication contents from multiple windows, combining the communication contents in real-time, and avoiding untimely manually combining the communication contents. Meanwhile, when the combined communication contents are displayed, they may be directly displayed at a current window, thereby avoiding switching between different windows and ensuring a consistency of user experiences.

The implementing process of the example method of the present disclosure is described by referenced to example embodiments below.

Figure 1:
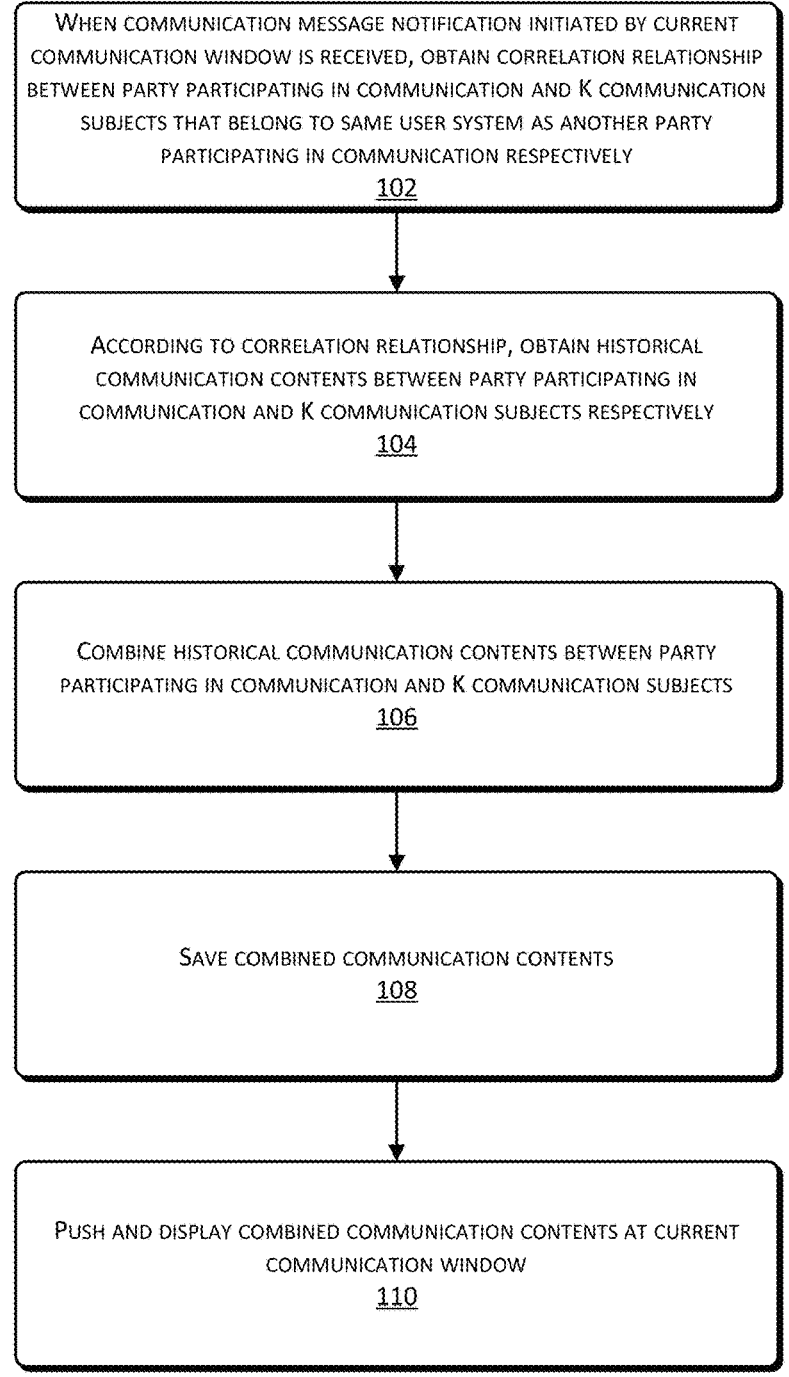
FIG. 1 is a flowchart illustrating an example method for combining communication contents in accordance with the present disclosure.

FIG. 1 is a flowchart illustrating an example method for combining communication contents in accordance with an example embodiment of the present disclosure.

At 102, when a communication message notification initiated by a current communication window is received, a correlation relationship between a party participating in a communication and K communication subjects that belong to a same user system which acts as another party participating in the communication is obtained respectively. For example, the K communication subjects that belong to the same user system may have a common principal account and each communication subject has a corresponding child account. Alternatively, the K communication subjects may use a same account and log into different communication tools in the same system. K≥1.

With the development of the Internet technology, there are various forms of chatting and communication. In an example form of chatting, the communication subjects of the chatting may belong to the same user system. For example, the same user system may include the following two examples.

At a first example, the K communication subjects have a same principal account and each communication subject has a corresponding child account. For example, there are three communication subjects B1, B2, and B3. Their corresponding principal account is B. Each of B1, B2, and B3 has a corresponding child account respectively. The three communication subjects B1, B2, and B3 have the same user system. When the communication message notification initiated by the current communication window is received, the communication parties are determined as a party A that participates in the communication and another party B1 that also participates in the communication. The communication subjects B2 and B3, who have the same user system as B1, also previously established the communication with the communication subject A. The correlation relationship between the communication subject A and the communication subject B1, the correlation relationship between the communication subject A and the communication subject B2, and the correlation relationship between the communication subject A and the communication subject B3 is obtained respectively.

At a second example, the K communication subjects use a same account and log into different communication tools of a same system. If user table data of the K communication subjects are in the same system and can be logged into the same system, the K communication subjects have the same user system. For the example of communication tools such as QQ™, QZone™, and QQ™ email, user table data of the three are in the same system and the users may use a same account and log in under the same system. Thus, QQ™ QZone™, and QQ™ email belong to the same user system. For the brevity of description, C1, C2, and C3 are used to refer to three communication or chatting tools respectively and C1, C2, and C3 have the same user system. The corresponding communication subject of each of the communication tools C1, C2, and C3 previously established the communication with the communication subject A. The correlation relationship between the communication subject A and the communication subject corresponding to the communication tool C1, the correlation relationship between the communication subject A and the communication subject corresponding to the communication tool C2, and the correlation relationship between the communication subject A and the communication subject corresponding to the communication tool C3 are obtained respectively.

For example, the current communication window may refer to a communication window that is opened by any party that participates in the communication. Thus, the communication message notification initiated by the current communication window may refer to a communication message notification initiated by the party A that participates in the communication or a communication message notification initiated by another party B that participates in the communication. In addition, when A or B initiates a new communication or content transfer, or A or B opens a system message of the communication window, such action may also be regarded as initiating the communication message notification.

At 104, according to the correlation relationship, historical communication contents between the party participating in the communication and the K communication subjects are obtained respectively.

According to the correlation relationship, the historical communication contents corresponding to the correlation relationship are obtained from a communication contents record database. Historical communication contents of the parties are automatically recorded and saved in the communication contents record database each time. The communication contents record database, for example, may be a database that is established according to a key-value structure. A key represents the correlation relationship between the communication parties. A value represents corresponding communication contents between the communication parties. The communication contents between the communication parties may also include a time of the corresponding communication between the communication parties.

At 106, the historical communication contents between the party participating in the communication and the K communication subjects are combined.

For example, the K communication subjects have the same user system. The communication or chatting contents between the party participating in the communication and the K communication subjects under same communication or chatting software may be combined. For another example, the communication or chatting contents between the party participating in the communication and the K communication subjects under different communication or chatting software of the same system may be combined. For instance, the communication party A has established a communication with the communication subjects B1, B2, and B3 respectively and uses the same communication or chatting software for communication. The present techniques may combine the respective communication contents that the party A have with the communication subjects B1, B2, and B3.

For another example, an example website provides a communication method through an instant messaging (IM) communication or chatting software based on a client side. The communication party A that participates in the communication may use the IM software to communicate with a particular communication subject. The example website may also provide another communication method through an on-site short message based on a web system. The communication party A that participates in another communication may communicate with another particular communication subject through the short message. The particular communication subject and another particular communication subject belong to the same user system. The present techniques may combine communication contents between the communication party A and the particular communication subject and communication contents between the communication party A and another particular communication subject.

At 108, the combined communication contents are saved.

At 110, the combined communication contents are pushed and displayed at the current communication window.

As described above, the present techniques provide the example method for combining the communication contents. The present techniques automatically combine the respective communication contents between one party participating in the communication and K communication subjects that belong to the same user system as another party participating in the communication and display the combined communication contents at the current communication window. The present techniques automatically combine communication contents from multiple windows, save time, combine the communication contents efficiently and in real-time, and avoid the untimeliness problem of manually combining the communication contents. In the meantime, the present techniques push and display the combined communication contents at the current window without requiring the user to switch between different communication or chatting windows, thereby enabling the user to view the combined communication contents at the current window and ensuring an consistency of the user experiences.

Figure 2:
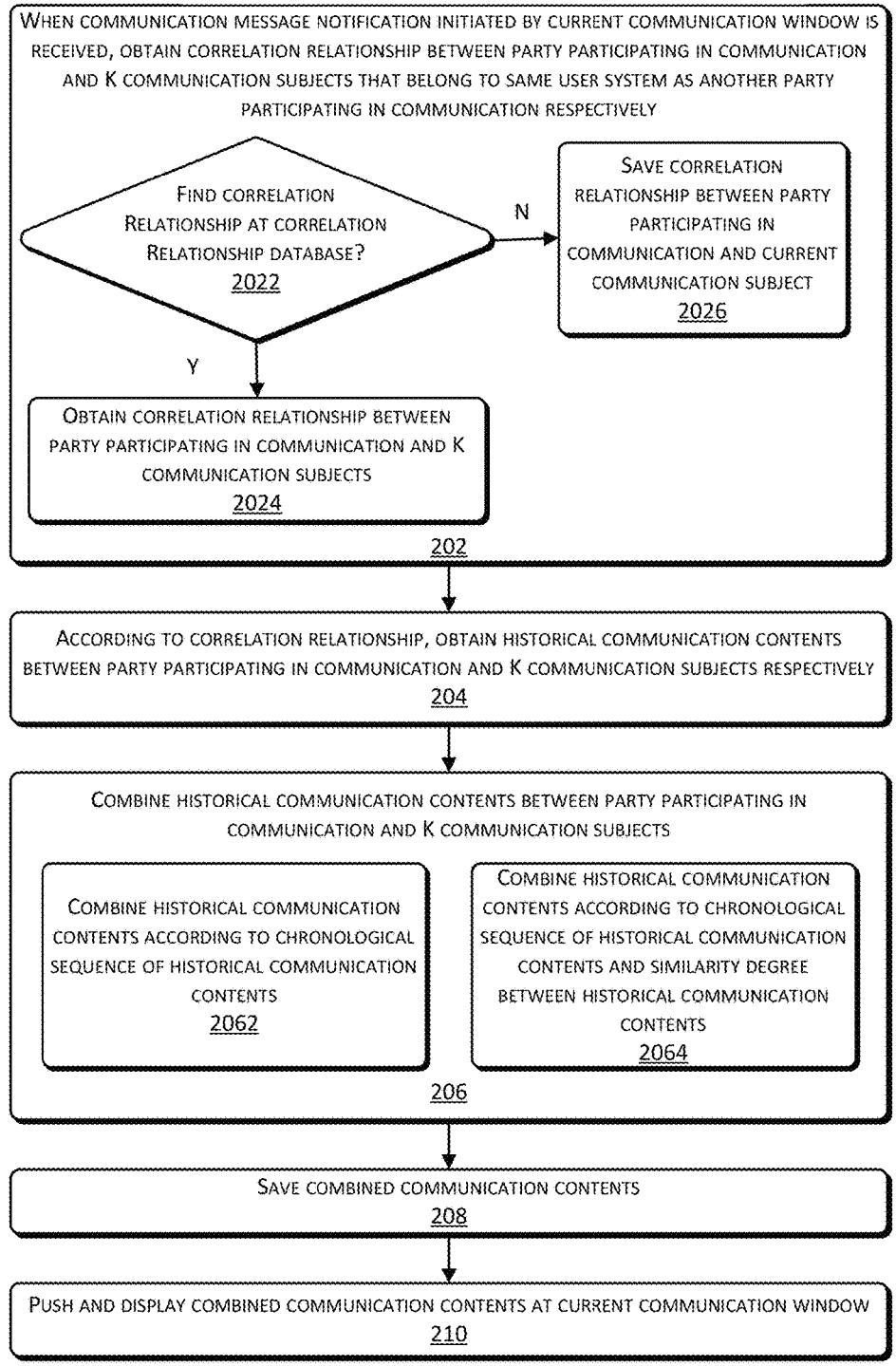
FIG. 2 is a flowchart illustrating another example method for combining communication contents in accordance with the present disclosure.

FIG. 2 is a flowchart illustrating another example method for combining communication contents in accordance with another example embodiment of the present disclosure.

At 202, when a communication message notification initiated by a current communication window is received, a correlation relationship between a party participating in a communication and K communication subjects that belong to a same user system as another party participating in the communication is obtained respectively. For example, the K communication subjects that belong to the same user system have a common principal account and each communication subject has a corresponding child account. Alternatively, the K communication subjects use a same account to log into different communication tools in the same system. K≥1.

For example, the K communication subjects may include a current communication subject that establishes a communication with a party participating in the communication and some other communication objects that belong to the same user system as the current communication subject and previously established some other communications with the party participating in the communication. For instance, the party participating in the communication is A. The K communication subject that have communicated with A are B1, B2, and B3. B1 and B2 previously communicated with A. B3 later establishes the communication with A. B3 is the current communication subject. B1 and B2 are two other communication subjects that are under the same user system as B3.

The correlation relationships have been established between the parties of any communication may be saved in a correlation relationship database. For example, operations at 202 may include the following operations.

At 2022, the correlation relationship between the party participating in the communication and the K communication subjects that belong to the same user system as another party participating in the communication is searched from saved correlation relationships in the correlation relationship database.

If the correlation relationship is found, operations at 2024 are performed. The correlation relationship between the party participating in the communication and the K communication subjects is obtained.

If the correlation relationship between the party participating in the communication and the current communication subject is not found, operations at 2026 are performed. The correlation relationship between the party participating in the communication and the current communication subject is saved.

For example, the correlation relationship database records the communication relationship between the parties. When the communication message notification initiated by the current communication window is received, the correlation relationship between the party participating in the communication and the current communication subject is searched from the correlation relationship database. If the correlation relationship between the party participating in the communication and the current communication subject is found in the correlation relationship database, this indicates that the party participating in the communication and the current communication subject previously had a communication relationship. Thus, the correlation relationship database records the communication relationship between the party participating in the communication and the current communication subject. The communication relationship between the party participating in the communication and the current communication subject is obtained and saved in a first cache memory. Data stored in the first cache memory may be set an expiration time, such as 10 minutes. If the correlation relationship between the party participating in the communication and the current communication subject is not found in the correlation relationship database, this indicates that the party participating in the communication and the current communication subject did not previously have a communication relationship. The correlation relationship between the party participating in the communication and the current communication subject is saved at the correlation relationship database and the first cache memory.

According to the user system to which the current communication subject belongs, one or more correlation relationships between the party participating in the communication and other communication subjects are obtained from the correlation relationship database. The correlation relationships between the party participating in the communication and the other communication subjects are also saved at the first cache memory. The other communication subjects may refer to other communication subjects except for the current communication subject in the same user system that have established some other communications with the party that participates in the communication.

For example, the obtained correlation relationships may be saved at the first cache memory. The expiration time of data stored in the first cache memory may be set at 10 minutes. If the communication message notification between the same communication parties is received again during the expiration time such as 10 minutes, the corresponding correlation relationships may be searched and obtained from the first cache memory, thereby saving searching and retrieving time and improving efficiency.

At 204, according to the correlation relationship, historical communication contents between the party participating in the communication and the K communication subjects are obtained respectively.

At 206, the historical communication contents between the party participating in the communication and the K communication subjects are combined.

At 208, the combined communication contents are saved.

At 210, the combined communication contents are pushed and displayed at the current communication window.

For example, the operations at 206 may include the following operations. At 2062, the historical communication contents between the party participating in the communication and the K communication subjects are combined according to a chronological sequence of the historical communication contents.

Alternatively, at 2064, the historical communication contents between the party participating in the communication and the K communication subjects are combined according to the chronological sequence of the historical communication contents and similarity degrees between the historical communication contents.

Figure 3:
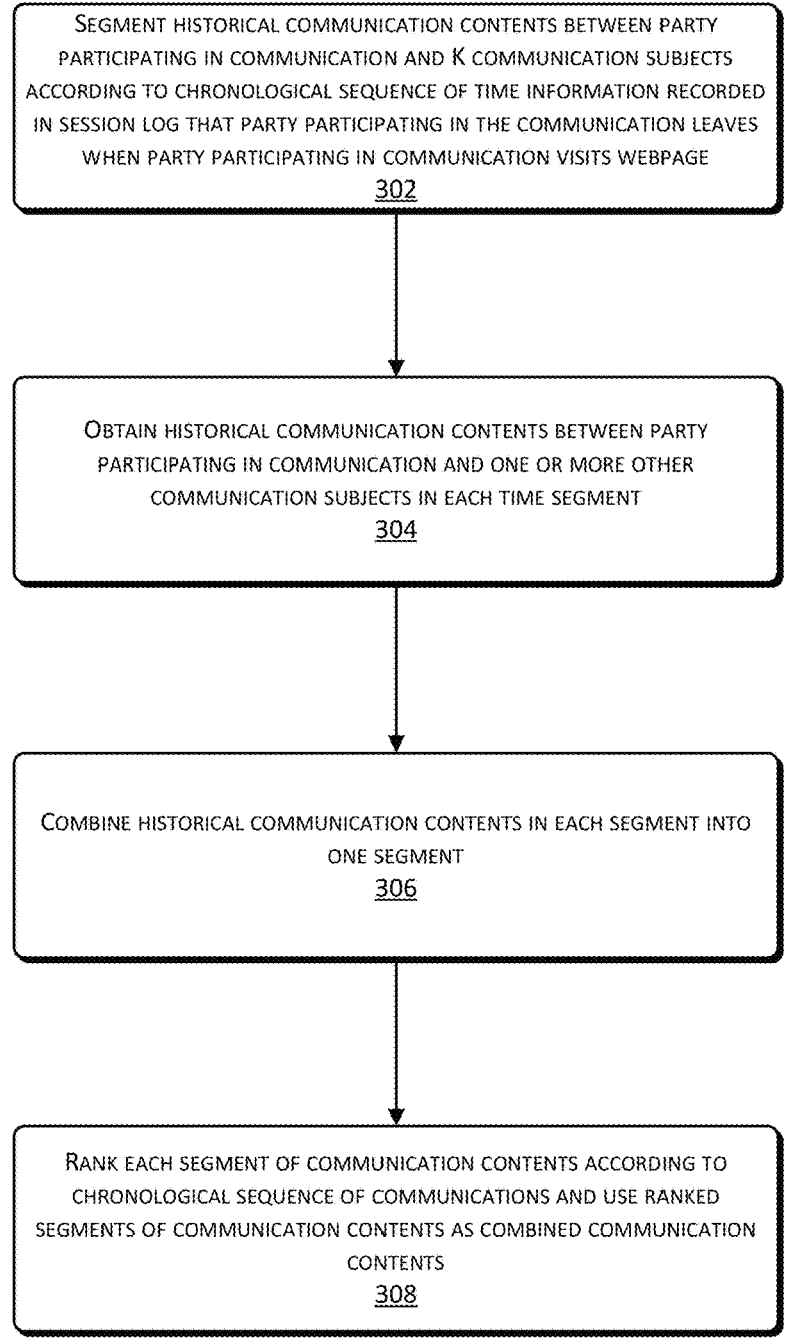
FIG. 3 is a flowchart illustrating an example method for combining communication contents according to a chronological sequence of the communication contents in accordance with the present disclosure.

FIG. 3 is a flowchart illustrating an example method for combining communication contents according to a chronological sequence of the communication contents in accordance with an example embodiment of the present disclosure. The operations at 2062 may include the following sub-operations.

At 302, the historical communication contents between the party participating in the communication and the K communication subjects are segmented according to the chronological sequence of time information recorded in a session log that the party participating in the communication leaves when the party participating in the communication visits a webpage.

Cookie and session are two commonly used techniques that a web browser at a client terminal and a web server maintain an online communication of the user. When the web browser at the client terminal sends an http request to the web server, the techniques of cookie add a string representing the web browser at the client terminal, which is a unique identification of a current visitor, at a header of data of the http request. The cookie is generally saved at hard disk or internal memory at the client terminal. The techniques of session maintain the string that represents the unique identification of the user at the web server. When the user that uses the web browser at the client terminal visits a webpage provided by the web server again, the web server finds that it is the communication with the same user.

The session may save time information record when the user at the client terminal interacts or communicates with an application program at the client terminal at the web server. When the session is initially used, the unique string that represents the unique identification of the user is obtained from the cookie, and the unique string is recorded in a session log and stored at the web server. Meanwhile, the session log also records a time that the user logs into and logs off the client terminal and the time that the user interacts and conducts communication at the client terminal. When the same user visits the client terminal again, the web server identifies the user based on the session log and records information generated by the user re-visits the client terminal in the session log. Thus, historical communication time may be obtained from the session log.

For instance, a user A logs into the client terminal at 8:00, logs off the client terminal at 9:00, logs into the client terminal at 12:00, logs off the client terminal at 13:30, logs into the client terminal at 14:00, logs off the client terminal at 16:00, logs into the client terminal at 18:00, and logs off the client terminal at 18:30. All historical communication time is obtained from the session log. The historical communication time is segmented according to the time that the user A logs into and off the client terminal. For instance, the historical communication time may be segmented into four time intervals: 08:00-09:00, 12:00-13:00, 14:00-16:00, and 18:00-18:30.

At 304, historical communication contents between the party participating in the communication and one or more other communication subjects in each time segment is obtained.

At 306, the historical communication contents in each segment are combined into one segment.

At 308, each segment of communication contents is ranked according to the chronological sequence of the communications and the ranked segments of the communication contents are used as the combined communication contents.

In other words, the combined communication contents include communication contents in multiple segments and the communication contents of the multiple segments are ranked according to the chronological sequence of the communication.

The present techniques associate the session log that the user leaves when the user visits the webpage with the communication contents, combine the historical communication contents according to time segments, and implement automatic division of the boundary of the communication contents. For example, the boundary of the communication contents may be understood as follows. For instance, the user A purchases three products from a same online shop. The user A inquires all of the three products with one or more customer service representatives of the online shop. The boundary of the communication contents may refer to communication contents related to an inquiry of a first product, communication contents related to an inquiry of a second product, and communication contents related to an inquiry of a third product. The present techniques, through automatically determining and dividing the boundary of the communication contents, achieve an accurate context of the combined communication contents and high correlation of information in the combined communication contents obtained by the user.

Figure 4:
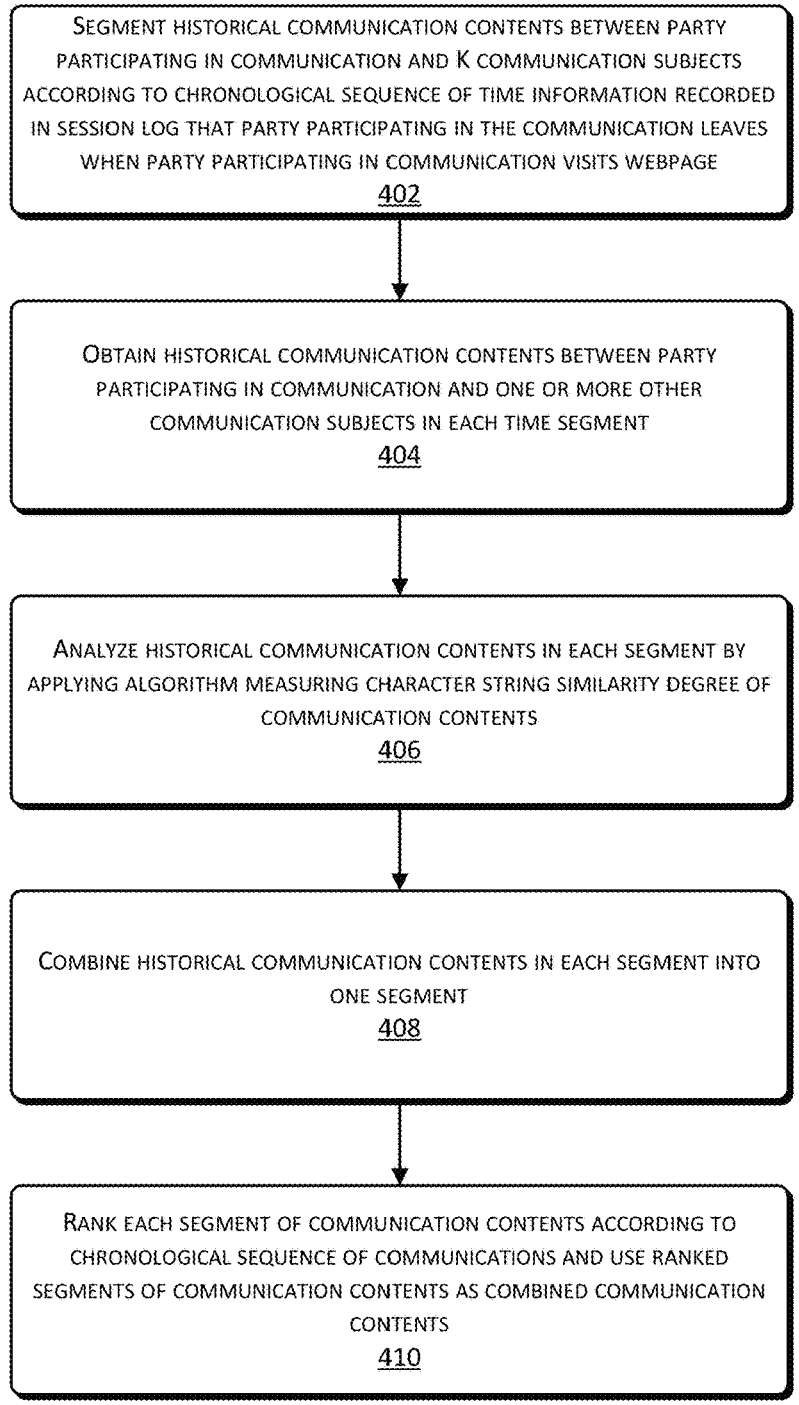
FIG. 4 is a flowchart illustrating an example method for combining communication contents according to a chronological sequence of the communication contents and a similarity degree between the communication contents in accordance with the present disclosure.

FIG. 4 is a flowchart illustrating an example method for combining communication contents according to a chronological sequence of the communication contents and a similarity degree between the communication contents in accordance with another example embodiment of the present disclosure. The operations at 2062 may include the following sub-operations.

At 402, the historical communication contents between the party participating in the communication and the K communication subjects are segmented according to the chronological sequence of time information recorded in a session log that the party participating in the communication leaves when the party participating in the communication visits a webpage.

At 404, historical communication contents between the party participating in the communication and one or more other communication subjects in each time segment is obtained.

At 406, the similarity degree between the historical communication contents in each segment is analyzed. For example, the historical communication contents in each segment may be analyzed according to an algorithm measuring a character string similarity degree of the communication contents.

If the character string similarity degree between two or more communication contents is higher than a preset similarity degree value and a time interval between the two or more communication contents is less than a preset minimal communication time interval, the two or more communication contents are repetitive and repetitive communication content is deleted. If the character string similarity degree between two or more communication contents is not higher than a preset similarity degree value or a time interval between the two or more communication contents is less than a preset minimal communication time interval, the communication contents are retained. Any similarity degree method of the conventional techniques may be used to calculate the character string similarity degree of the communication contents. The present disclosure does not impose any restriction herein.

For example, when the user A purchases a product and initially inquires a customer service representative of colors of the product. After a while, the user A does not remember whether he/she inquires of the colors of the product and re-inquires the customer service representative of colors of the product. When the communication contents are combined, the character string similarity degree between the two communication contents that inquire the "colors of the product" is higher than the preset similarity degree value and the time interval between the two inquiries is less than the preset minimal communication time interval, only one communication regarding the "colors of the product" is retained and the other repetitive communication is deleted.

At 408, the historical communication contents in each segment are combined into one segment.

At 410, each segment of communication contents is ranked according to the chronological sequence of the communication and the ranked segments of the communication contents are used as the combined communication contents.

As described above, the present techniques provide the example method for combining the communication contents. The present techniques automatically combine the respective communication contents between one party participating in the communication and K communication subjects that belong to the same user system as another party participating in the communication, determine the boundary of the communication contents according to the communication time or a combination of the communication time and the character string similarity degree, implement a high accuracy of the context of the communication contents, and avoid repetitive communication contents. In the meantime, the present techniques push and display the combined communication contents at the current window without requiring the user to switch between different communication or chatting windows, thereby enabling the user to view the combined communication contents at the current window and ensuring an consistency of the user experiences.

Figure 5:
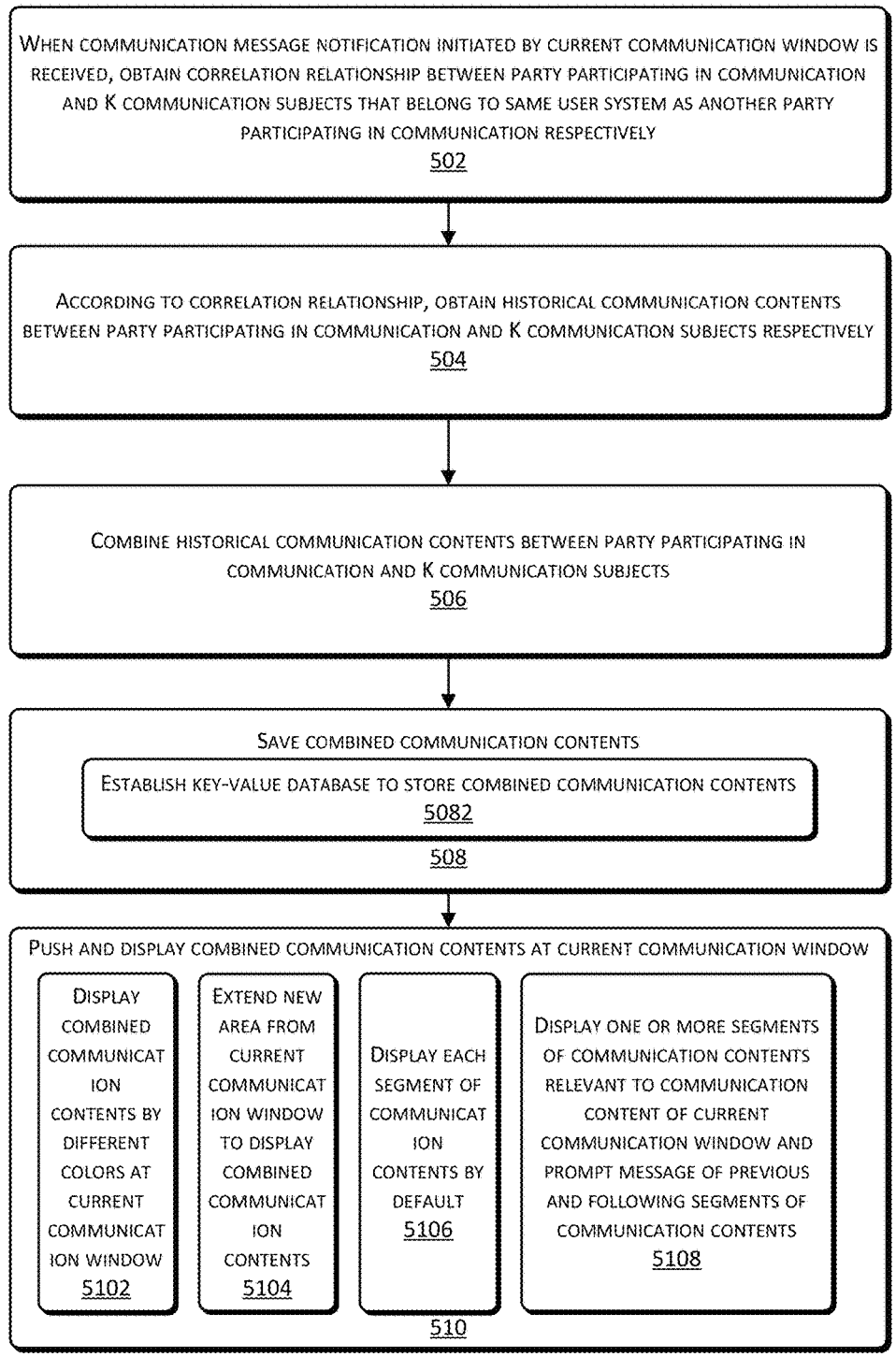
FIG. 5 is a flowchart illustrating another example method for combining communication contents in accordance with the present disclosure.

FIG. 5 is a flowchart illustrating another example method for combining communication contents in accordance with yet another example embodiment of the present disclosure.

At 502, when a communication message notification initiated by a current communication window is received, a correlation relationship between a party participating in a communication and K communication subjects that belong to a same user system as another party participating in the communication is obtained respectively. For example, the K communication subjects that belong to the same user system have a common principal account and each communication subject has a corresponding child account. Alternatively, the K communication subjects use a same account to log into different communication tools in the same system. K≥1.

At 504, according to the correlation relationship, historical communication contents between the party participating in the communication and the K communication subjects are obtained respectively.

At 506, the historical communication contents between the party participating in the communication and the K communication subjects are combined.

At 508, the combined communication contents are saved. The operations at 508 may include the following operations.

At 5082, a key-value database is established to store the combined communication contents. A key represents a corresponding relationship between the party participating in the communication and the user system. A value represents the combined communication contents.

For example, with respect to the communication subject A and the communication subjects B1, B2, and B3 that have the same user system B, communication contents between the communication subjects A and B1, communication contents between the communication subjects A and B2, and communication contents between the communication subjects A and B3 are obtained respectively. The communication contents are combined. The key-value database is established to save the combined communication contents. The key represents a corresponding relationship between the communication subject A and the user system B. A value represents the combined communication contents. The value may be segmented into multiple segments according to time segments. In other words, the value may be a result of a list. Data obtained from the key-value database may be saved in a second cache memory that has an expiration time. Within the expiration time, when the combined communication contents need reviewing, they can be directly obtained from the second cache memory.

At 510, the combined communication contents are pushed and displayed at the current communication window. At 510, when the combined communication contents are displayed, example display forms may include the following.

At 5102, the combined communication contents are displayed by different colors at the current communication window. For example, the current communication contents displayed at the current communication window are while. The combined communication contents may be displayed at the current communication window in red.

Alternatively, at 5104, a new area is extended from the current communication window to display the combined communication contents. For example, the current communication window displays the current communication contents. A portion around the current communication window, such as on top of the communication window or extended from a right side of the communication window, is used to display the combined communication contents.

At 510, when the combined communication contents are pushed to and displayed at the current communication window, the combined communication contents may be displayed according to the following operations.

At 5106, each segment of communication contents is displayed by default. For example, when the user A directly chats or communicates at IM without opening a webpage, a chat log within a day is combined and loaded by default.

Alternatively, at 5108, one or more segments of communication contents relevant to the communication content of the current communication window are displayed. In addition, a prompt message of a previous segment of communication contents and a following segment of communication contents relevant to the communication content of the current communication window may be displayed.

For example, a user logs into a webpage at 15:00 and uses web chatting for communication at 15:35. The combined communication contents corresponding to a time period between 15:00 and 15:35 are displayed at the current communication window through the method for combining communication contents. Each of the communication parties may click a prompt message to display communication contents corresponding to a preceding time period. If each of the communication parties wants to view the combined communication contents corresponding to the time period between 15:00 and 15:35, such party may click the prompt message to view the combined communication contents corresponding to the time period between 15:00 and 15:35 again. The combined communication contents corresponding to the time period between 15:00 and 15:35 may be directly obtained from the second cache memory.

Under the present techniques, the communication parties may choose any one or more sub-operations from 5102, 5104, 5106, and 5108 to display the combined communication contents.

As described above, the present techniques provide the example method for combining the communication contents. The present techniques automatically combine the respective communication contents between one party participating in the communication and K communication subjects that belong to the same user system as another party participating in the communication and display the combined communication contents at the current communication window. The present techniques automatically combine communication contents from multiple windows, save time, combine the communication contents efficiently and in real-time, and avoid the untimeliness problem of manually combining the communication contents. In the meantime, when pushing and displaying the combined communication contents at the current window, the present techniques display the combined communication contents in different colors at the current window or extend a new area near the current communication window to display the combined communication contents. The present techniques may display each segment of communication contents completely or one or more segments of communication contents. The present techniques ensure that the communication parities view the combined communication contents at the current window, implement various presenting forms to display the combined communication contents, meet different needs of the user, and ensure the consistency of the user experiences.

Furthermore, the conventional techniques, when combining the communication contents, need to open multiple communication windows to view respective communication contents at teach communication window. The methods for combing communication contents of the present techniques automatically combine the communication contents and display the combined communication contents at the current communication window. In other words, the present techniques combine and display the communication contents of multiple communication windows. The communication contents of the multiple communication windows include not only communication contents from the same communication software but also communication contents from different communication software of the same user system under the same system architecture. For example, a website provides asynchronous transfer mode (ATM) for online chatting tool, a web messaging function in a web system that has the same user system as the chatting tool, and a messaging board system for the communication parities to communicate cross the border. The methods for combing communication contents of the present techniques combine the communication contents generated from the ATM chatting tool and the communication contents generated from the messaging board system.

Figure 6:
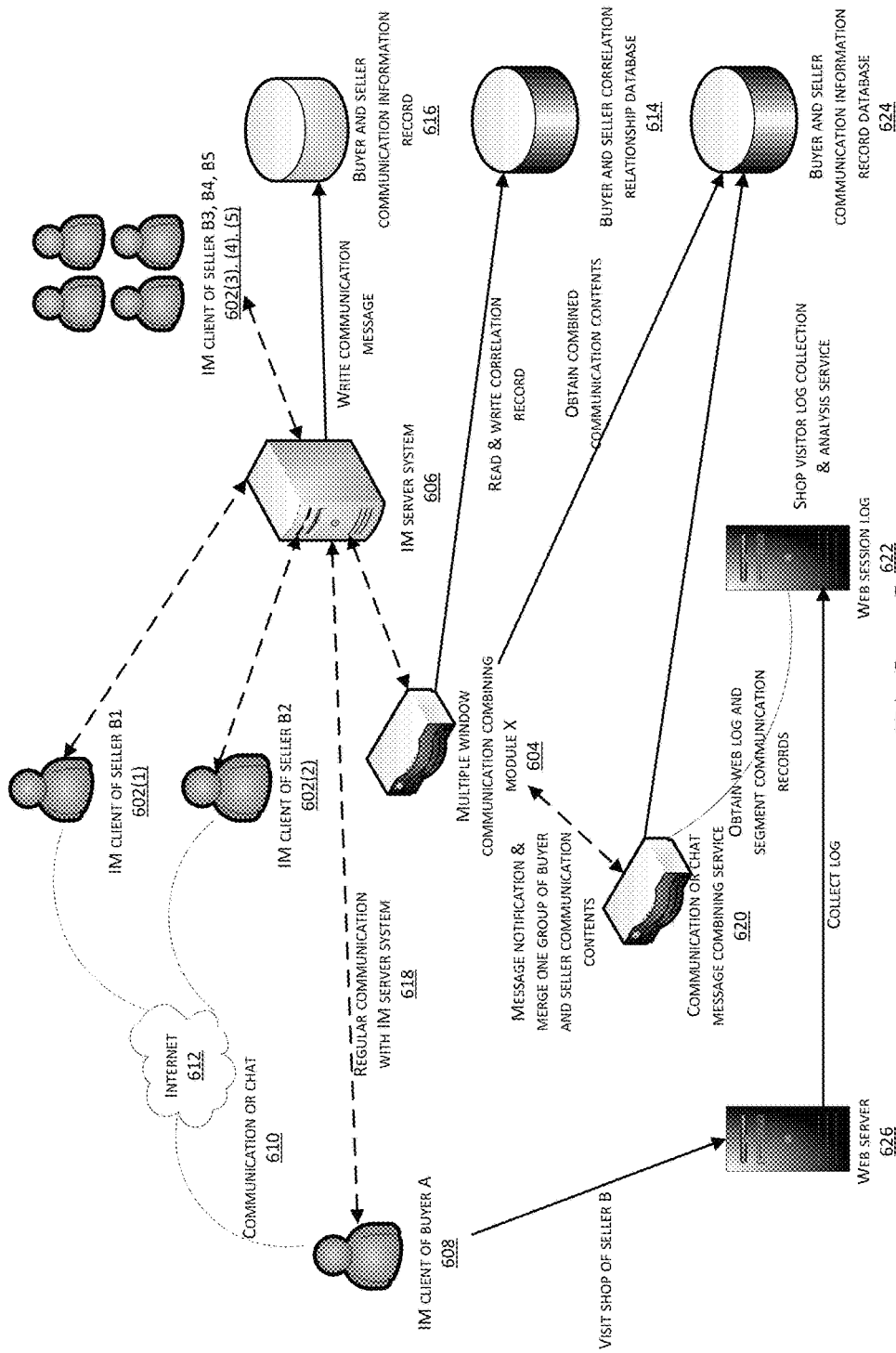
FIG. 6 is a diagram illustrating an example principle of combining communication contents in accordance with the present disclosure.

The following description uses a specific example to illustrate an implementation of the above method. By using an example of a communication or chatting tool at an e-commerce website, FIG. 6 illustrates a diagram of an example principle of combining communication contents in accordance with the present disclosure.

Under a same user system of a seller B (principal account) 602, there are child accounts including sellers B1 602(1), B2 602(2), B3 602(3), B4 602(4), and B5 602(5).

There is a multiple window communication combining module X 604 at a server which provides application system services, and is implemented by Java™ language (or C or C++ language). The multiple window communication combining module X 604 receives a message notification from an IM server system 606.

When a buyer A 608 and a child account B1 602(1) initiate a new communication or chat 610 or content transfer through a network such as Internet 612, the multiple window communication combining module X 604 receives a notice from the IM server system 606, inquires a buyer and seller correlation relationship database 614 whether there is a correlation relationship between the IM client of buyer A 608 and the child account B1 602(1), and any correlation relationship between the IM clients of buyer A 608 and other child accounts B2 602(2), B3 602(3), B4 602(4), and B5 602(5). If there is the correlation relationship, such correlation relationship is obtained from the buyer and seller correlation relationship database 614. If there is no correlation relationship, a correlation record is generated such as: A→B1.

The IM server system 606 writes the communication or chat 610 or content transfer record into a buyer and seller communication information record 616. The IM server 606 conducts regular communication 618 with IM clients including an IM client of the buyer A 608 or an IM client of any of the principle or child account the use system B 602.

The buyer and seller correlation relationship database 614 stores the correlation relationship records. Data obtained from the buyer and seller correlation relationship database 614 may be stored in cache memory of the buyer and seller correlation relationship database 614 and generally an expiration time is set, such as 5 minutes. When reading the correlation relationship information, the multiple window communication combining module X 604 firstly inquires the cache memory and then the buyer and seller correlation relationship database 614 if no information is found at the cache memory. The multiple window communication combining module X 604 then writes the obtained information into the cache memory.

The communication or chat message combining service 620 is an application system service, which receives the message notification from the multiple window communication combining module X 604. When the IM Client of buyer A 608 has the communication 610 with any child account of the seller B 602, the multiple window communication combining module X 604 informs the communication or chat message combining service 620. The communication or chat message combining service 620, after receiving the message notification, starts an asynchronous thread or process and combines the communication contents between the buyer A 608 and all child accounts of the seller B 602 that are correlated with the buyer A 608 according to the correlation relationships. The communication contents are saved in the buyer and seller communication information records 616. The communication or chat message combining service 620 searches a web session log 622 of the user, divides the communication contents according to a log time session, combines communication contents with adjacent web visiting log time into one communication content, ranks the communication content according to a sequence of communication time, and saves the combined communication contents into a buyer and seller communication information record database 624. When the IM client of buyer A 608 conducts a visit of a shop of the seller B 602, which may be represented as one or more webpages at a web server 626, the web server 626 collects a log of the user and saves it in the web session log 622. The web session log 622 stores information of visitors who visit the shop of the seller B 602 and provides log analysis service.

The buyer and seller communication information record database 624 saves data in a key→value structure. The key represents a primary key that is composed of the identifications of the buyer A 608 and the principal account of the seller B 602. The buyer and seller communication information record database 624 saves asset of communication contents of all child accounts according to time sequence. The value represents an ordered character set of communication contents between the IM clients of the buyer A 608 and the child accounts B1 602(1), B2 602(2), B3 602(3), B4 602(4), and B5 602(5), which is also compressed to save space. The value is divided into multiple segments according to time segments. In other words, the value is a list structure. The communication or chat message combining service 620 saves the combined communication contents in the buyer and seller communication information record database 624. The multiple window communication combining module X 604 obtains the combined communication contents from the buyer and seller communication information record database 624.

The IM server system 606 and the IM clients of the buyer A 608 and the seller B 602 also have the following new functions based on their original functions.

The IM server system 606 sends the combined communication contents to the IM client of the buyer A 608 or the seller B 602.

The IM client provides a display area and relevant functions. The buyer A 608 or the child account of the seller B 602, after viewing a prompt message pushed by the IM server system 606, sends a request to load the combined communication contents into the IM client and displays them at the display area.

Correspondingly, an example operation process of the buyer A 608 and its corresponding combining process for the communication contents may be as follows.

(1) The buyer A 608 visits an online shop of the seller B 602 and enters into an interface of product detail.
(2) The buyer A 608 clicks an online IM customer service child account B1 602(1) and starts an IM client;
(3) The buyer A 608 and the online IM customer service child account B1 602(1) start communication.
(4) The multiple window communication combining module X 604 receives a system message that the IM client of the buyer A 608 sends communication content or the buyer A 608 opens an IM messaging window.
(5) The multiple window communication combining module X 604, after receiving a message notification that the IM clients of the buyer A 608 and the online IM customer service child account B1 602(1) establish communication, inquires the buyer and seller correlation relationship database 614 to find any established communication relationship between the buyer A 608 and all child accounts of the seller B 602, pushes such established communication relationships to the current communication parties, i.e., the buyer A 608 and the child account B1 602(1) of the seller B 602. In addition, the multiple window communication combining module X 604 may also write such established communication relationships into its cache memory and set an expiration time such as 5 minutes. The multiple window communication combining module X 604 may firstly search the correlation relationships from the cache memory.

(6) If it is a first time that the buyer A 608 and the child account B1 602(1) establishes the communication connection, the correlation relationship between the buyer A 608 and the child account B1 602(1) is written into the buyer and seller correlation relationship database 614.

(7) The IM client of the buyer A 608 or the child account B1 602(1), after receiving the message pushed by the multiple window communication combining module X 604, displays a prompt message such as "displaying communication contents between the buyer A 608 and the child account B2 602(2) and the child account B3 602(3)" at a prompt area.

(8) When the IM client of the buyer A 608 or the child account B1 602(1) sends a "display" command, a request is sent to the multiple window communication combining module X 604 to retrieve the communication contents between the IM clients of the buyer A 608 and the child account B2 602(2) and the child account B3 602(3).

(9) The communication or chat message combining service 620 obtains time information of the communication between the buyer A 608 and the child accounts of the seller B 602 from the web session log 622, finds communication contents in each segment according to the time segments that the IM client of the buyer A 608 stays at a webpage of the seller B 602, combines the communication contents respectively, organizes the combined communication contents into a message stream according to communication time sequence, and returns the message stream to the IM client of the buyer A 608 or the child account B1 602(1).

(10) The communication contents relating to the buyer A 608 with respect to the current product or any other product of the seller B 602 are displayed at the IM client of the buyer A 608 and/or the child account B1 602(1).

As described above, the present techniques provide the example method for combining the communication contents. The present techniques automatically combine the respective communication contents between the buyer A and multiple child accounts of the seller B, automatically determines a boundary of the communication contents according to a time sequence of the communication contents, combine the communication contents according to segments, and display the combined communication contents to the buyer A and the child account B1 of the seller. The present techniques timely display the communication contents, avoid repetitive communication contents, and implement a high accuracy of the context of the communication contents. In addition, the child account B1 of the seller may more accurately understand the requirements of the needs of the buyer A according to the combined communication contents.

The buyer A may clearly understand questions that are already inquired to determine questions that need further inquiry, thereby satisfying needs of the communication parties.

It is noted that, for the purpose of brevity, the above example method embodiments are described by a sequence of combination of operations. One of ordinary skill in the art would understand that the preset disclosure is not limited by the described sequence of the operations. According to the present disclosure, some operations may take other sequence or occur concurrently. In addition, one of ordinary skill in the art would appreciate that the embodiments described herein are example embodiments and one or more of their involved operation might not be necessary.

Based on the above example method embodiments, the present disclosure also provides corresponding example system embodiments to implement operations of the above example method embodiments.

Figure 7:
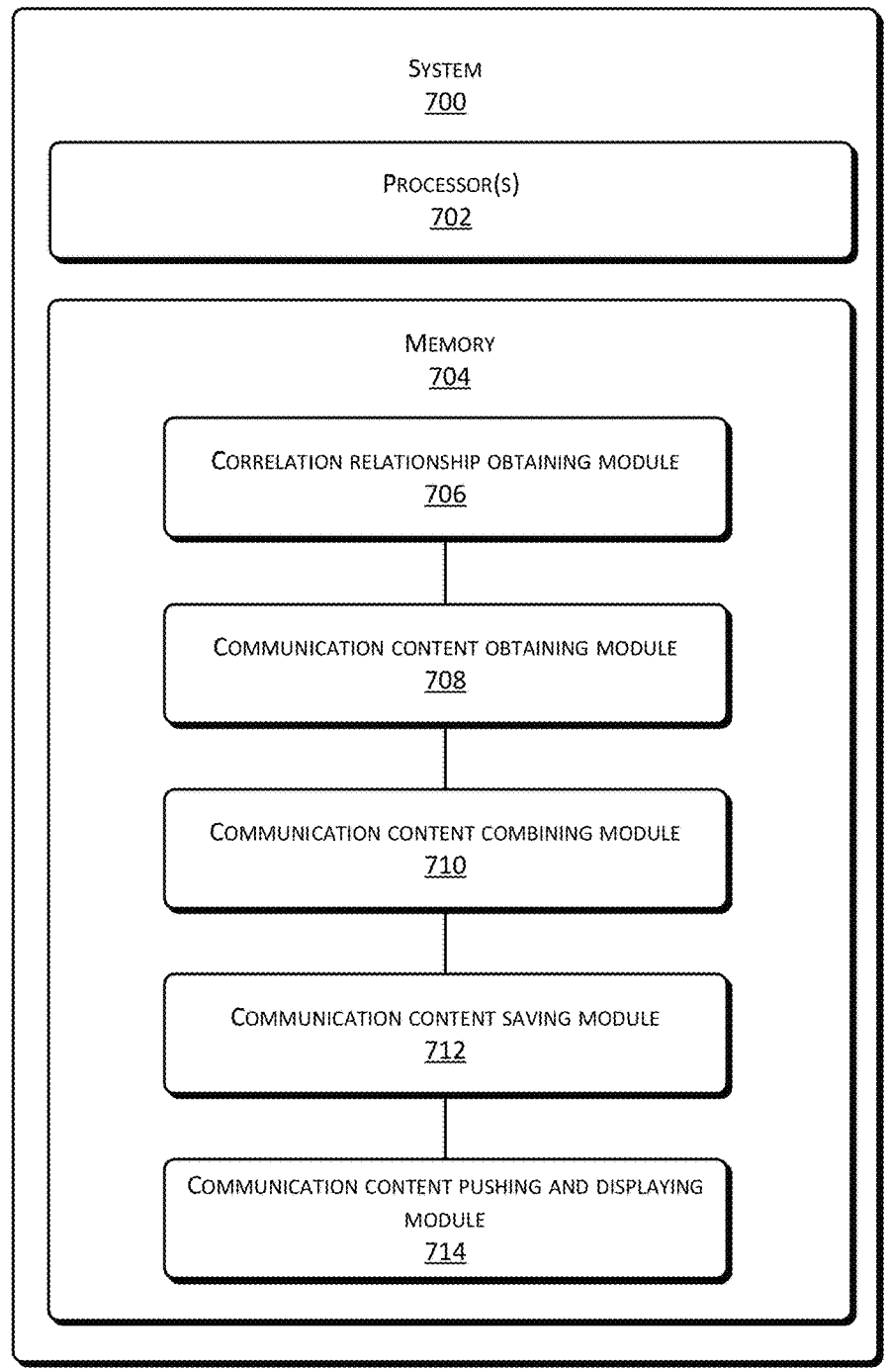
FIG. 7 is a diagram illustrating an example system for combining communication contents in accordance with the present disclosure.

FIG. 7 is a diagram illustrating an example system 700 for combining communication contents in accordance with an example embodiment of the present disclosure.

The system 700 may include one or more processor(s) 702 or data processing unit(s) and memory 704. The memory 704 is an example of computer-readable media. As used herein, "computer-readable media" includes computer storage media and communication media. Computer storage media includes volatile and non-volatile, removable and non-removable media implemented in any method or technology for storage of information such as computer-executed instructions, data structures, program modules, or other data. In contrast, communication media may embody computer-readable instructions, data structures, program modules, or other data in a modulated data signal, such as a carrier wave. As defined herein, computer storage media does not include communication media.

The memory 704 may store therein a plurality of modules including a correlation relationship obtaining module 706, a communication content obtaining module 708, a communication content combining module 710, a communication content saving module 712, and a communication content pushing and displaying module 714.

The correlation relationship obtaining module 706, when receiving a communication message notification initiated by a current communication window, obtains a correlation relationship between a party participating in a communication and K communication subjects that belong to a same user system as another party participating in the communication respectively. The K communication subjects that belong to the same user system have a common principal account and each communication subject has a corresponding child account. Alternatively, the K communication subjects use a same account and logs in different communication tools in the same system. K≥1.

The communication content obtaining module 708, according to the correlation relationship, obtains historical communication contents between the party participating in the communication and the K communication subjects respectively.

The communication content combining module 710 combines the historical communication contents between the party participating in the communication and the K communication subjects.

The communication content saving module 712 saves the combined communication contents.

The communication content pushing and displaying module 714 pushes and displays the combined communication contents at the current communication window.

As described above, the present techniques provide the example system for combining the communication contents. The present techniques, through the communication contents combining module, automatically combine the respective communication contents between one party participating in the communication and K communication subjects that belong to the same user system as another party participating in the communication, thereby automatically combining the communication contents efficiently and in real-time and avoiding the untimeliness problem of manually combining the communication contents. In the meantime, the present techniques push and display the combined communication contents at the current window without requiring the user to switch between different communication or chatting windows, thereby enabling the user to view the combined communication contents at the current window and ensuring an consistency of the user experiences.

Figure 8:
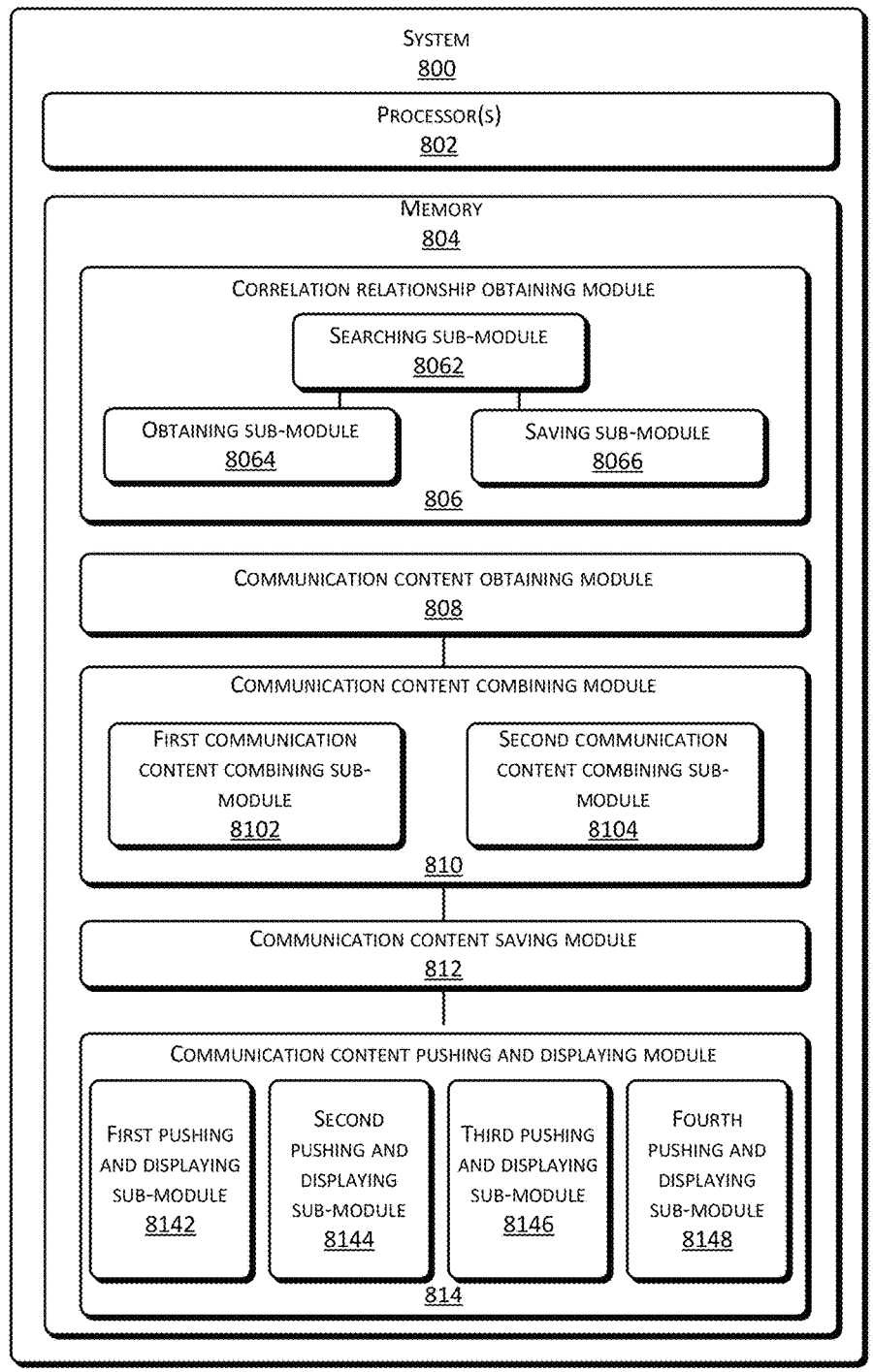
FIG. 8 is a diagram illustrating another example system for combining communication contents in accordance with the present disclosure.

FIG. 8 is a diagram illustrating an example system 800 for combining communication contents in accordance with another example embodiment of the present disclosure. The system 800 may include one or more processor(s) 802 or data processing unit(s) and memory 804. The memory 804 is an example of computer-readable media. The memory 804 may store therein a plurality of modules including a correlation relationship obtaining module 806, a communication content obtaining module 808, a communication content combining module 810, a communication content saving module 812, and a communication content pushing and displaying module 814.

The correlation relationship obtaining module 806, when receiving a communication message notification initiated by a current communication window, obtains a correlation relationship between a party participating in a communication and K communication subjects that belong to a same user system as another party participating in the communication respectively. The K communication subjects that belong to the same user system have a common principal account and each communication subject has a corresponding child account. Alternatively, the K communication subjects use a same account and logs in different communication tools in the same system. K≥1.

For example, the K communication subjects may include a current communication subject that establishes the communication with the party participating in the communication in the current communication window and some other communication subjects, except for the current communication subject, belong to the same user system that previously established another communication with the party participating in the communication.

For example, the correlation relationship obtaining module 806 may include a searching sub-module 8062 and an obtaining sub-module 8064. The searching sub-module 8062 searches the correlation relationship between the party participating in the communication and the K communication subjects that belong to the same user system as another party participating in the communication from the saved correlation relationships. The obtaining sub-module 8064, when the searching sub-module 8062 finds the correlation relationship, obtains the correlation relationship between the party participating in the communication and the K communication subjects of another party participating in the communication.

For example, the correlation relationship obtaining module 806 may also include a saving sub-module 8066. When the searching sub-module 8062 does not find the correlation relationship between the party participating in the communication and the current communication subject from the saved correlation relationships, the saving sub-module 8066 saves the correlation relationship between the party participating in the communication and the current communication subject.

For example, the communication content obtaining module 808, according to the correlation relationship, obtains historical communication contents between the party participating in the communication and the K communication subjects respectively.

For example, the communication content combining module 810 may include a first commination content combining sub-module 8102 and/or a second communication module 8104. The first communication content combining sub-module 8102 combines the historical communication contents between the party participating in the communication and the K communication subjects according to a chronological sequence of the historical communication contents. Alternatively, the second communication content combining sub-module 8104 combines the historical communication contents between the party participating in the communication and the K communication subjects according to the chronological sequence of the historical communication contents and similarity degrees between the historical communication contents.

Figure 9:
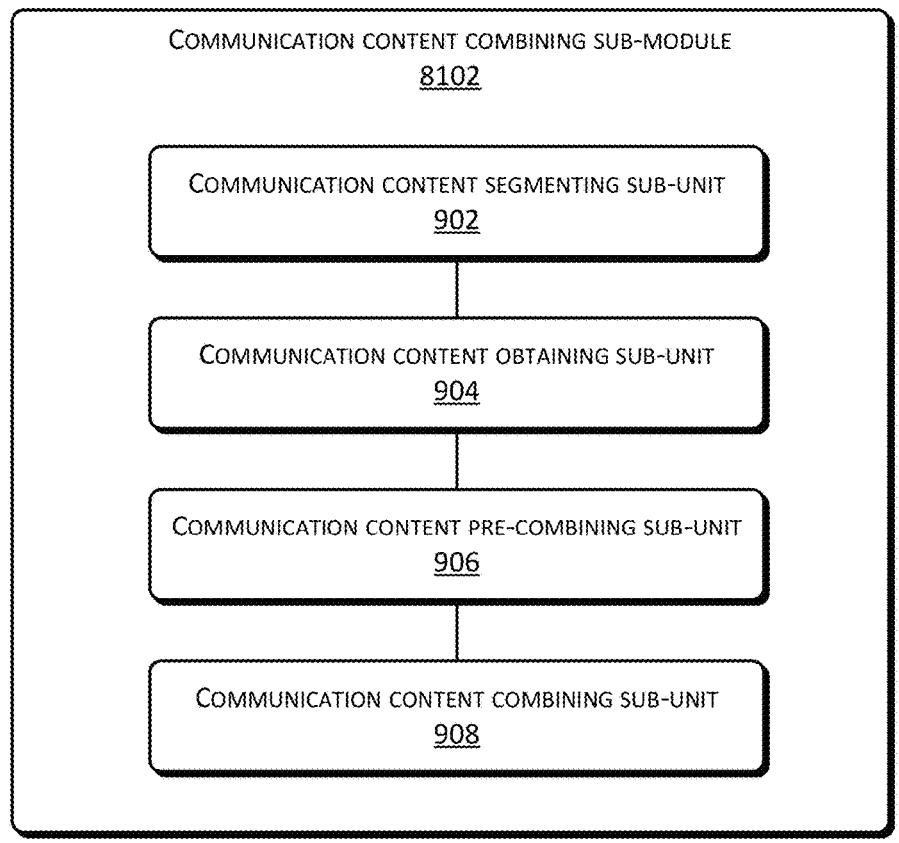
FIG. 9 is a diagram illustrating an example communication contents combining sub-module in accordance with the present disclosure.

Further, referring to FIG. 9, FIG. 9 is a diagram illustrating an example contents combining sub-module in accordance with the present disclosure. In the example of FIG. 9, the first communication content combining sub-module 8102 includes a communication content segmenting sub-unit 902, a communication content obtaining sub-unit 904, a communication content pre-combining sub-unit 906, and a communication content combining sub-unit 908.

The communication content segmenting sub-unit 902 segments the historical communication contents between the party participating in the communication and the K communication subjects according to the chronological sequence of time information recorded in a session log that the party participating in the communication leaves when the party participating in the communication visits a webpage.

The communication content obtaining sub-unit 904 obtains historical communication contents between the party participating in the communication and one or more other communication subjects in each time segment.

The communication content pre-combining sub-unit 906 combines the historical communication contents in each segment into one segment.

The communication content combining unit 908 ranks each segment of communication contents according to the chronological sequence of the communication and uses the ranked segments of the communication contents as the combined communication contents.

The communication content saving module 812 saves the combined communication contents. For example, the communication contents saving module 812 may be used to establish a key-value database to store the combined communication contents. A key represents a corresponding relationship between the party participating in the communication and the user system. A value represents the combined communication contents.

The communication content pushing and displaying module 814 pushes and displays the combined communication contents at the current communication window. For example, according to a display form, the communication content pushing and displaying module 814 may include a first pushing and displaying sub-module 8142 or a second pushing and displaying sub-module 8144. The first pushing and displaying sub-module 8142 displays the combined communication contents by different colors at the current communication window. Alternatively, the second pushing and displaying sub-module 8144 extends a new area from the current communication window to display the combined communication contents.

According to displayed contents, the communication content pushing and displaying module 814 may include a third pushing and displaying sub-module 8146 or a fourth pushing and displaying sub-module 8148. The third pushing and displaying sub-module 8146 displays each segment of communication contents by default. The fourth pushing and displaying sub-module 8148 displays one or more segments of communication contents relevant to the communication content of the current communication window. In addition, the fourth pushing and displaying module 8148 displays a prompt message of a previous segment of communication contents and a following segment of communication contents.

As described above, the present techniques provide another example system for combining the communication contents. The present techniques, through the communication contents combining module, automatically combine the respective communication contents between one party participating in the communication and the K communication subjects that belong to the same user system as another party participating in the communication, intelligently determine a boundary of the communication contents, segment the communication contents, and then combine the communication contents. The present techniques automatically combining the communication contents efficiently, ensure combining the communication contents in real-time, save time, and avoid the untimeliness problem of manually combining the communication contents. In the meantime, the present techniques push and display the combined communication contents in the form of a prompt message to the communication parities. Furthermore, when displaying the combined communication contents, the present techniques directly display the contents at the current window without requiring the user to switch between different windows, thereby ensuring a consistency of the user experiences.

The above example system embodiments are described briefly as their techniques are similar to those of the example method embodiments. The relevant portions may be referred to the corresponding portions of the example method embodiments.

Each example embodiment of the present disclosure is described progressively. Each example embodiment emphasizes on the differences from the other example embodiments. The same or similar portions of the example embodiments may be referred to each other.

One of ordinary skill in the art would easily understand that any combination or application of the above example embodiments may be feasible. Thus, any combination of the example embodiments is also an embodiment of the present disclosure, which is not detailed herein due to passage restriction.

The present techniques may be used in various universal or specific computing system or configuration environments, such as personal computer (PC), server computer, handheld or portable device, tablet, multi-processor system, microprocessor based system, set-top box, programmable consumer electronic device, network PC, small-scale computer, large-scale computer, or a distributing computing device that includes any of the above system or device.

The present techniques may be generally described or implemented in the context of computer-executable instructions, such as program modules. Generally, a program module includes instances, programs, objects, components, or data structures that implement specific tasks or specific abstract data types. In addition, the present techniques may also be implemented in a distributive computing environment. In the distributive computing environment, remote processing devices that are connected by a communication network perform the tasks. In the distributive computing environment, the program modules may locate at storage device including local or remote computer storage media.

In the present disclosure, a component, apparatus, system, etc. refer to a relevant entity applicable in the computer filed, such as hardware, combination of hardware and software, software, or software in execution. In detail, for example, the component may be, but is not limited to, a process that implemented at the processor, processor, object, executable component, executable thread, program, and/or computer. In addition, the server or an application program or script that is executable at the server may also be a component. One or more components may be in the process or thread in execution. In addition, the component may locate at one local computing device and/or distribute at two or more computing devices, and store at various computer-readable media. The component may also communicate according to signals including one or more data packets. For example, the component may interact with another component from the local system or the distributive system. The component may communicate through local or remote process by signal through the Internet and/or any other data signals that interact with other systems.

Finally, it should be noted that the term such as a first or a second is only used to differentiate one operation or entity from another operation or entity. It is not required or implied that there is any actual relationship or sequence between these entities or operations. In addition, the term "including," "comprising," or any variation thereof refers to non-exclusive inclusion so that a process, method, product, or device that includes a plurality of elements does not only include the plurality of elements but also any other element that is not expressly listed, or any element that is essential or inherent for such process, method, product, or device. Without more restriction, the elements defined by the phrase "including a . . . " does not exclude that the process, method, product, or device includes another same element in addition to the element.

In addition, the term "and/or" in the present disclosure represents not only a "and" relationship but also an "or" relationship. If a technique A and a technique B have the "and" relationship, the example embodiment may include both technique A and technique B. If the technique A and the technique B have the "or" relationship, the example embodiment may include either only technique A or only technique B.

One of ordinary skill in the art should understand that the embodiments of the present disclosure may be methods, systems, or the programming products of computers. Therefore, the present disclosure may be implemented by hardware, software, or in combination of both. In addition, the present disclosure may be in a form of one or more computer programs containing the computer-executable instructions which may be implemented in the computer-readable medium (including but not limited to disks, CD-ROM, optical disks, etc.).

The present disclosure is described by referring to the flow charts and/or block diagrams of the method, device (system) and computer program of the embodiments of the present disclosure. It should be understood that each flow and/or block and the combination of the flow and/or block of the flowchart and/or block diagram may be implemented by computer program instructions. These computer program instructions may be provided to the general computers, specific computers, embedded processor or other programmable data processors to generate a machine, so that a device of implementing one or more flows of the flow chart and/or one or more blocks of the block diagram may be generated through the instructions operated by a computer or other programmable data processors.

These computer program instructions may also be stored in other computer-readable media which may instruct a computer or other programmable data processors to operate in a certain way, so that the instructions stored in the computer-readable storage generate a product containing the instruction device, wherein the instruction device implements the functions specified in one or more flows of the flow chart and/or one or more blocks of the block diagram.

These computer program instructions may also be loaded in a computer or other programmable data processors, so that the computer or other programmable data processors may operate a series of operation steps to generate the process implemented by a computer. Accordingly, the instructions operated in the computer or other programmable data processors may provide the steps for implementing the functions specified in one or more flows of the flow chart and/or one or more blocks of the block diagram.

The embodiments are merely for illustrating the present disclosure and are not intended to limit the scope of the present disclosure. It should be understood for persons in the technical field that certain modifications and improvements may be made and should be considered under the protection of the present disclosure without departing from the principles of the present disclosure.

The above description describes the example methods and systems for combining communication contents according to the present disclosure. The present disclosure uses specific examples to illustrate the principles and implementations of the present techniques. The illustration of the above example embodiments only helps understand the methods and core concepts of the present disclosure. In the meantime, one of ordinary skill in the art may make any change in the detailed implementation and application scope according to the present techniques. The descriptions herein shall not be construed as a restriction to the present disclosure.

What is claimed is:

1. A method comprising:
   obtaining a correlation relationship between a party participating in a communication and one or more communication subjects that belong to a same user system, wherein the one or more communication subjects act as a representative of another party participating in the communication and use a same account to log into different communication tools in the system to establish communication with the party;
   according to the correlation relationship, obtaining historical communication contents between the party participating in the communication and the one or more communication subjects respectively;
   combining, in real time from multiple windows, the historical communication contents between the party participating in the communication and the one or more communication subjects, according to a chronological sequence of the historical communication, wherein the combining the historical communication contents comprises:

segmenting the historical communication contents between the party participating in the communication and the one or more communication subjects according to a chronological sequence of time information recorded in a session log that the party participating in the communication leaves when the party participating in the communication visits a webpage;

obtaining the historical communication contents between the party participating in the communication and one or more other communication subjects in each time segment;

combining the historical communication contents in each time segment into one segment;

ranking each segment of communication contents according to a chronological sequence of the communications; and using the ranked segments of the communication contents as the combined communication contents;

saving the combined historical communication contents; and clicking a prompt message by the party participating in the communication or by the representative participating in the communication to display historical communication contents of a preceding time period at a current window.

2. The method of claim 1, wherein the one or more communication subjects include a current communication subject that establishes the communication with the party participating in the communication and another communication subject that belongs to the same user system as the current communication subject and previously established another communications with the party participating in the communication.

3. The method of claim 2, wherein the obtaining the correlation relationship comprises:

searching the correlation relationship between the party participating in the communication and the one or more communication subjects that belong to the same user system from a correlation relationship database; and if the correlation relationship is found in the correlation relationship database, obtaining the correlation relationship between the party participating in the communication and the one or more communication subjects.

4. The method of claim 3, wherein the obtaining the correlation relationship comprises, if a correlation relationship between the party participating in the communication and the current communication subject is not found in the correlation relationship database, saving the correlation relationship between the party participating in the communication and the current communication subject.

5. The method of claim 1, wherein the combining the historical communication contents comprises:

finding one or more boundaries of the historical communication contents;

segmenting historical communication contents according to the one or more boundaries; and combining the segmented historical communication contents.

6. The method of claim 1, wherein the saving the combined historical communication contents comprises establishing a key-value database to store the combined communication contents, a key representing a corresponding relationship between the party participating in the communication and the same user system, and a value representing the combined communication contents.

7. The method of claim 1, wherein the displaying comprises displaying the combined communication contents by different colors at a current communication window.

8. The method of claim 1, wherein the displaying comprises extending a new area from a current communication window to display the combined communication contents.

9. The method of claim 1, wherein the displaying further comprising displaying a prompt message of a previous segment of communication contents and a following segment of communication contents relevant to the communication content of the current communication window.

10. A system comprising:

one or more processors; and memory including instructions executable by the one or more processors, which when executed perform the following steps:

obtaining a correlation relationship between a party participating in a communication and one or more communication subjects that belong to a same user system, wherein the one or more communication subjects act as a representative of another party participating in the communication and use a same account to log into different communication tools in the system to establish communication with the party;

obtaining, according to the correlation relationship, historical communication contents between the party participating in the communication and the one or more communication subjects respectively;

combining, in real time from multiple windows, the historical communication contents between the party participating in the communication and the one or more communication subjects, according to a chronological sequence of the historical communication contents, wherein the combining the historical communication contents comprises:

segmenting the historical communication contents between the party participating in the communication and the one or more communication subjects according to a chronological sequence of time information recorded in a session loci that the party participating in the communication leaves when the party participating in the communication visits a webpage;

obtaining the historical communication contents between the party participating in the communication and one or more other communication subjects in each time segment;

combining the historical communication contents in each time segment into one segment;

ranking each segment of communication contents according to a chronological sequence of the communications; and using the ranked segments of the communication contents as the combined communication contents;

saving the combined historical communication contents; and displaying historical communication contents of a preceding time period at a current window.

11. One or more non-transitory computer-readable media stored thereon computer-executable instructions executable by one or more processors to perform operations comprising:

obtaining a correlation relationship between a party participating in a communication and one or more communication subjects that belong to a same user system, wherein the one or more communication subjects act as a representative of another party participating in the communication and use a same account to log into different communication tools in the system to establish communication with the party;

according to the correlation relationship, obtaining historical communication contents between the party participating in the communication and the one or more communication subjects respectively;

combining, in real time from multiple windows, the historical communication contents between the party participating in the communication and the one or more communication subjects, according to a chronological sequence of the historical communication contents, wherein the combining the historical communication contents comprises:

segmenting the historical communication contents between the party participating in the communication and the one or more communication subjects according to a chronological sequence of time information recorded in a session log that the party participating in the communication leaves when the party participating in the communication visits a webpage;

obtaining the historical communication contents between the party participating in the communication and one or more other communication subjects in each time segment;

combining the historical communication contents in each time segment into one segment;

ranking each segment of communication contents according to a chronological sequence of the communications; and using the ranked segments of the communication contents as the combined communication contents;

saving the combined historical communication contents; and displaying the combined historical communication contents of a preceding time period at a current window.

12. The method of claim 1, wherein the combining includes merging of historical communication contents from multiple windows, and the combining including combining the historical communication contents in each time segment into one segment.

13. The method of claim 12, wherein the displaying includes displaying each segment of communication contents by default or displaying one or more segments of communication contents relevant to a communication content of a current communication window.

14. The method of claim 1, wherein the combining the historical communication contents further comprises combining the historical communication contents between the party participating in the communication and the one or more communication subjects according to a similarity degree between the historical communication contents.

* * * * *